US008392064B2

(12) United States Patent
Thrun et al.

(10) Patent No.: US 8,392,064 B2
(45) Date of Patent: Mar. 5, 2013

(54) SYSTEMS, METHODS AND DEVICES FOR ADAPTIVE STEERING CONTROL OF AUTOMOTIVE VEHICLES

(75) Inventors: Sebastian Thrun, Stanford, CA (US); Jesse S. Levinson, Hillsborough, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 710 days.

(21) Appl. No.: 12/127,596

(22) Filed: May 27, 2008

(65) Prior Publication Data

US 2009/0299573 A1    Dec. 3, 2009

(51) Int. Cl.
*B62D 6/00* (2006.01)
(52) U.S. Cl. ......................................................... 701/41
(58) Field of Classification Search ................. 701/41, 701/301, 1, 23–26, 28, 36; 180/415, 167–170
See application file for complete search history.

(56) References Cited

U.S. PATENT DOCUMENTS

| | | | |
|---|---|---|---|
| 4,361,202 A | 11/1982 | Minovitch | |
| 5,208,750 A | 5/1993 | Kurami et al. | |
| 5,765,116 A * | 6/1998 | Wilson-Jones et al. | 701/41 |
| 6,004,592 A * | 12/1999 | Holdren et al. | 426/59 |
| 6,050,359 A * | 4/2000 | Mouri et al. | 180/415 |
| 6,185,492 B1 * | 2/2001 | Kagawa et al. | 701/41 |
| 6,256,561 B1 * | 7/2001 | Asanuma | 701/41 |
| 6,314,348 B1 * | 11/2001 | Winslow | 701/23 |
| 6,405,132 B1 * | 6/2002 | Breed et al. | 701/301 |
| 6,473,678 B1 * | 10/2002 | Satoh et al. | 701/41 |
| 6,489,887 B2 * | 12/2002 | Satoh et al. | 340/436 |
| 6,493,619 B2 | 12/2002 | Kawazoe et al. | |
| 6,895,318 B1 | 5/2005 | Barton et al. | |
| 6,977,630 B1 * | 12/2005 | Donath et al. | 345/7 |
| 7,191,061 B2 * | 3/2007 | McKay et al. | 701/213 |
| 7,216,023 B2 * | 5/2007 | Akita | 701/41 |
| 7,510,038 B2 * | 3/2009 | Kaufmann et al. | 180/169 |
| 7,555,367 B2 * | 6/2009 | Kuge | 701/1 |

(Continued)

FOREIGN PATENT DOCUMENTS

WO    WO 2005/102822 A1    3/2005
WO    WO 2007063397 A1 *  6/2007

OTHER PUBLICATIONS

Omae, M., Hashimoto, N., Fujioka, T., Shimizu, H., "*The Application of RTK-GPS and Steer-By-Wire Technology to the Automatic Driving of Vehicles and an Evaluation of Driver Behavior*," IATSS Research, vol. 30, No. 2, pp. 29-38 (2006).

(Continued)

*Primary Examiner* — John Q Nguyen
*Assistant Examiner* — Michael Ng
(74) *Attorney, Agent, or Firm* — Crawford Maunu PLLC (57) ABSTRACT

A variety of methods, systems, devices and arrangements are implemented for automated assistance for a driver. One such method relates to a synergistic combination of automation and human control for a motor vehicle traveling on a lane, thereby allowing human-based decisions to be supplement (or be supplemented by) automated decisions. Specific aspects facilitate maintenance of the vehicle on the lane. The vehicle is automatically steered towards a lateral offset within the vehicle lane. Steering input from the driver results in changes to this lateral offset. This modification of the lateral offset can be used to allow the driver to follow any trajectory parallel to the road, including trajectories where the vehicle is not centered within the lane.

25 Claims, 4 Drawing Sheets

U.S. PATENT DOCUMENTS

| | | | | |
|---|---|---|---|---|
| 7,634,331 | B2* | 12/2009 | Kuge | 701/1 |
| 7,765,066 | B2* | 7/2010 | Braeuchle et al. | 701/301 |
| 2003/0046021 | A1 | 3/2003 | Lasky et al. | |
| 2004/0193374 | A1* | 9/2004 | Hac et al. | 701/301 |
| 2004/0262063 | A1* | 12/2004 | Kaufmann et al. | 180/169 |
| 2005/0267684 | A1* | 12/2005 | Kawakami et al. | 701/301 |
| 2006/0030987 | A1 | 2/2006 | Akita | |
| 2006/0047390 | A1 | 3/2006 | Scherl et al. | |
| 2007/0021889 | A1* | 1/2007 | Tsuchiya | 701/41 |
| 2009/0048738 | A1* | 2/2009 | Iwazaki et al. | 701/44 |
| 2011/0231063 | A1* | 9/2011 | Kim | 701/41 |

OTHER PUBLICATIONS

"Active Steering Delphi's Active Steering Systems are offering vehicle manufacturers innovative new ways to advance vehicle performance—with either hydraulic or electric power steering," <http://delphi.com/news/featureStories/fs_2007_04_30_001/>, 2007.

Winstead, Vincent "*Autonomous Lane Changing Using Model Predictive Control*," SAE 2005 World Congress & Exhibition, Apr. 2005, Detroit, MI, USA, Session: Intelligent Vehicle Initiative (IVI) Technology—Advanced Controls.

Nishida, Makoto; Kawakami, Seiji; Watanabe, Akihiro, "*Development of Lane Recognition Algorithm for Steering Assistance System*," SAE 2005 World Congress & Exhibition, Apr. 2005, Detroit, MI, USA, Session: Intelligent Vehicle Initiative (IVI) Vehicle Navigation Systems.

Cerone, V.; Milanese, M.; Regruto, D, "*Experimental results on combined automatic lane keeping and driverapos;s steering*," American Control Conference, 2007. ACC apos; vol. 07 , Issue , Jul. 9-13, 2007 pp. 3126-3131.

Iihoshi, Akira, "*Driver Assistance System (Lane Keep Assist System)*," Presentation to WP-29 ITS Round Table Feb. 18, 2004 Geneva.

"*Nissan Demos New Lane Keeping Products*,"<http://ivsource.net/archivep/2001/feb/010212_nissandemahtml#article>, 2001.

Watanabe, A. Nishida, M., "*Lane detection for a steering assistance system*" Intelligent Vehicles Symposium, 2005. Proceedings. IEEE Jun. 6-8, 2005 pp. 159-164 ISBN: 0-7803-8961-1.

\* cited by examiner

SYSTEMS, METHODS AND DEVICES FOR ADAPTIVE STEERING CONTROL OF AUTOMOTIVE VEHICLES

FIELD OF THE INVENTION

The present invention relates to hardware designs and software algorithms that facilitate assistive steering for automotive vehicles.

BACKGROUND

Interest in assistive and autonomous techniques for passenger vehicles is increasing rapidly; the benefits of partial autonomy are both numerous and profound. In a traditional automotive vehicle, when steering an automobile, a driver has to continuously adjust the steering direction. Some of those adjustments implement discrete choices, such as the choice to change lanes on a highway, or the choice to turn at an intersection. Other adjustments arise from the curvature of the road, or from the vehicle dynamics. For example, on a curved road a driver would drive off the road without adjustment of the steering wheel. Thus, even when staying in the same lane, drivers have to constantly change the angle of the steering wheel to stay in their lane. The constant need to adjust the steering direction causes a burden on drivers often resulting in fatigue. Failure to provide this constant adjustment results in unintended lane departures, which is one of the primary causes of accidents on highways.

Active steering assistance systems that automatically adjust the steering angle to follow the road can make it difficult for the driver to correct the vehicle's position. For example, the steering wheel may turn independent from the driver. Furthermore, the detection of lane markings, optically or otherwise, is sometimes infeasible.

Lane Departure Systems that merely provide warning signals allow the driver to maintain control; however, such systems require a high level of driver responsibility to steer the vehicle. That is, simply alerting a driver to the possibility of a lane change does not assist the physical steering.

SUMMARY

The present invention is directed to systems and methods for use with vehicle driving assistance. These and other aspects of the present invention are exemplified in a number of illustrated implementations and applications, some of which are shown in the figures and characterized in the claims section that follows.

According to the present invention, specific systems and methods enable a vehicle to maintain a particular lateral offset relative to the direction of a road even in the absence of steering input, wherein a driver-initiated change in a steering angle induces a corresponding change in the vehicle's lateral offset to the road. Aspects of the invention involve assisting drivers in following lanes including, for example, methods and systems for determining road curvature, and for trimming the steering angle of the vehicle in response to road curvature.

Aspects of the present invention relate to a synergistic combination of automation and human control for a motor vehicle traveling on a lane, thereby allowing human-based decisions to supplement (or be supplemented by) automated decisions. Specific aspects facilitate maintenance of the vehicle on the lane.

Embodiments of the present invention steer the vehicle towards a lateral offset within a vehicle lane. Steering input from the driver results in changes to this lateral offset. This modification of the lateral offset can be used to allow the driver to follow any trajectory parallel to the road, including trajectories where the vehicle is not centered within the lane.

In one embodiment of the present invention, the angle of the steering wheel is interpreted as an intention of the driver to deviate from the current parallel trajectory. A centered steering wheel is interpreted as an indication mat me vehicle should actively drive parallel to the current road and lane. Automatic adjustment of the vehicle wheel direction reduces the need for driver input other than when the driver desires a change in lateral offset.

In one embodiment of the present invention, vehicle localization, based upon input from one or more sensors including, but not limited to, an optical camera or cameras, an active laser or lasers, radar, an inertial measurement unit, tire odometer, global positioning system (GPS), and readings from current or future apparatuses embedded in or around roads for vehicle navigation, are used in a device to help a vehicle follow a road with little or no steering input from the driver. In a specific instance, the device enables a tire trim once a desired lateral offset is in place. The lateral offset could be set to the center of a lane or other offsets within the lane. Steering inputs from the driver are used to shift position within a lane by modifying the lateral offset or to change lanes.

In another embodiment of the present invention, the system allows the driver to use the steering wheel to change lateral offsets by occasionally nudging the vehicle back to the desired lateral offset. In this manner, the steering from the driver, even on curvy roads, can be facilitated. For example, the driver maintains control over the vehicle despite needing to perform substantially less steering activity than is required in a normal vehicle. This can be particularly useful where, for example, vehicle localization can be of insufficient quality to precisely pinpoint the vehicle within a lane, while still being sufficient to estimate the curvature of the road at the vehicle's location, such as by inexpensive GPS. The vehicle approximates a trajectory parallel to the road, but slight lateral error may accrue slowly over time due to the insufficient quality in localization.

The above summary is not intended to describe each illustrated embodiment or every implementation of the present invention. The figures and detailed description that follow, including that described in the appended claims, more particularly exemplify these embodiments.

BRIEF DESCRIPTION OF THE DRAWINGS

The invention may be more completely understood in consideration of the detailed description of various embodiments of the invention that follows in connection with the accompanying drawings in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is believed to be useful for assisting a driver of a vehicle. A specific embodiment the present invention facilitates maintaining an offset within a lane as a function of driver steering input. While the present invention is not necessarily limited to such applications, various aspects of the invention may be appreciated through a discussion of various examples using this context.

Aspects of the present invention relate to a synergistic combination of automation and human control for a motor vehicle traveling on a lane, thereby allowing human-based decisions to supplement (or be supplemented by) automated decisions. Specific aspects facilitate maintenance of the vehicle on the lane.

A specific embodiment of the invention facilitates the ability of a driver to stay on a lane with minimal or no steering where, for example, the road is curved, if the crown of a road slowly pulls the vehicle off the road, or if the vehicle alignment is off. Thus, one aspect of the invention is directed toward trimming the direction of steerable tires to maintain the vehicle within a lane. This trimming can include compensation for various factors, such as road curvature, lane drift or wind. The compensation can be such that even in the absence of human steering input, the vehicle drives parallel to the direction of the road through both straight and curved roads. Intuitively speaking, the trimming of the tires effectively straightens out curved roads in that the steering necessary by a driver can be minimal. This straightening effect is achieved by trimming the direction of the steerable tires to follow the road curvature or to otherwise compensate for potential lane departures. In an ideal case, a driver will not have to actively steer so as long as he desires that the vehicle continue to drive parallel to the direction of the lane (e.g., the vehicle follows the direction of the lane whether straight or curved).

Generally speaking, trimming of a vehicle involves a modification of the vehicle's direction of travel. This often involves a minor adjustment to the direction of the vehicle's tires and/or other aspects that relate to power or other conditions relative to the vehicle's direction of travel. This adjustment may or may not include a like adjustment to the steering wheel angle. In some instances, other trimming adjustments are possible, such as (differential) power adjustment to the vehicle tires or traction control.

In one embodiment of the invention, an automated steering system maintains a desired lateral offset relative to the lane boundary of the road or, on a multi-lane street or highway, or the closest lane. Aspects of the present invention allow for the automated steering system to be supplemented by driver input. In one instance, the driver can choose the lateral offset for the automated steering system. So as long as the driver does not change this offset choice (e.g., by actuating the steering wheel), the vehicle maintains the selected fixed lateral offset to the boundary of the lane. This can include matching a curvature of the lane and correcting for drift (e.g., due to external forces or tire misalignment). In an ideal situation, once a driver has chosen a suitable lateral offset, no further steering input is required from the driver to stay in a lane.

As mentioned above, the driver is afforded the opportunity to modify the lateral offset by, for example, actuation of the steering wheel. Such an action can override the present memorized lateral offset. For example, a driver may actively change lanes on a multiple-lane highway by steering the vehicle off one lane and onto another lane. When this steering intervention is complete, as manifested by the car resuming a course parallel to the new lane and/or the driver asserting no further torque on the steering wheel, the new lateral offset is memorized and used. Thus, while the driver indicates that the current offset is sufficient (e.g., the steering wheel is not used in an attempt to change the vehicle position/current offset) the vehicle will attempt to automatically maintain the memorized lateral offset to the lane boundary.

Accordingly, embodiments of this invention can be particularly useful such that even on curved roads, little to no steering is necessary to keep the vehicle at a fixed lateral offset to the lane boundary. At the same time, the driver can change vehicle direction, when desired, by using the steering wheel to change desired lateral offsets or even leave the current lane. Specific aspects of the present invention compensate for the curvature of roads, allowing a driver to steer the vehicle as if every road is perfectly straight, while providing the driver with the ability to override automated steering to allowing direct control of the vehicle by the driver.

Figure 1:
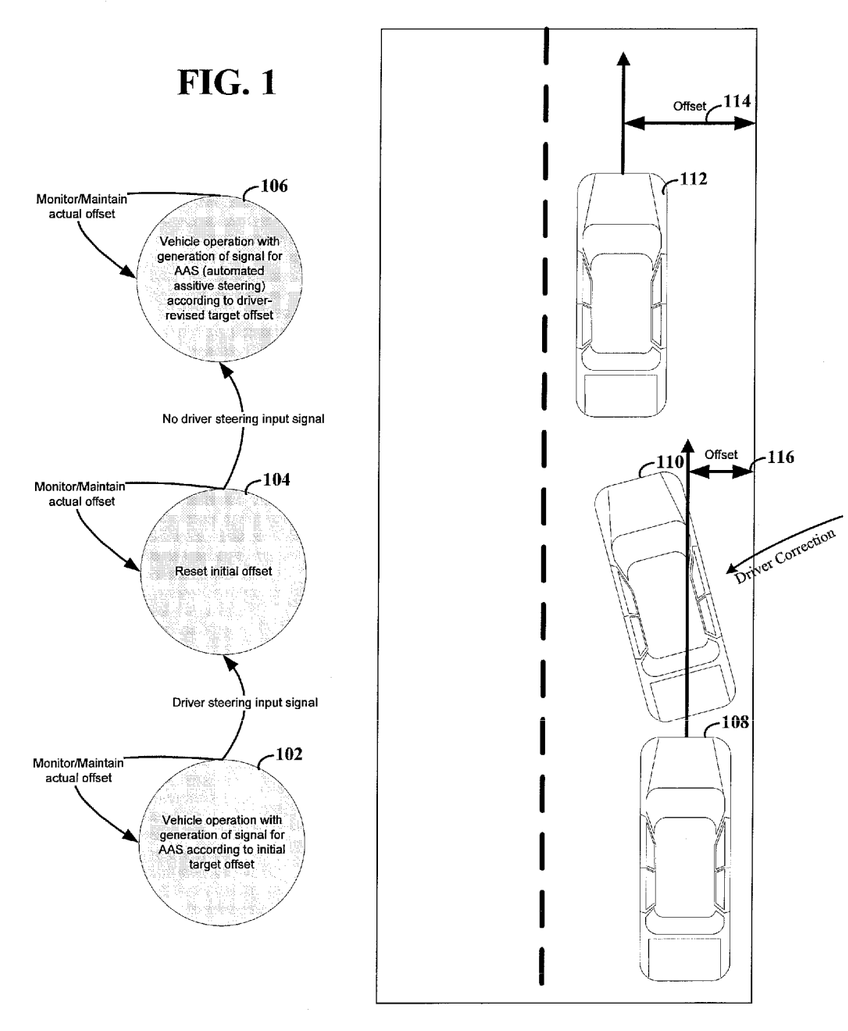
FIG. 1 shows a state diagram for an automated driving assistance system and corresponding vehicle placement, according to an example embodiment of the present invention.

FIG. 1 shows a state diagram for an automated driving assistance system and corresponding vehicle placement, according to an example embodiment of the present invention. The vehicle at position 108 is at an offset 116 within the lane and traveling substantially parallel to the lane. State 102 represents vehicle operation with generation of signal for automated assistive steering (AAS) to maintain the offset 116. The AAS signal is derived from the actual position and/or direction of the vehicle within the lane. As discussed in more detail hereafter, the AAS signal can be used to adjust, or trim, the steering of the vehicle as a function of a difference between the offset 116 and the actual vehicle position and/or as a function of the direction of the vehicle (e.g., maintaining a direction that is substantially parallel to the lane). The system can remain in state 102, thereby maintaining offset 116, until a driver steering input signal is received.

Upon receiving a driver steering input signal, the system enters state 104 wherein the offset 116 is reset/modified. The vehicle responds to the driver steering input by steering the vehicle accordingly, as shown by vehicle position 110. In this specific example, the driver has attempted to steer the vehicle to the left by, for example, turning the steering wheel in the left direction. Conceptually, the driver input can be considered a driver correction to the current automated steering by modifying the offset 116. The system remains in state 104 until the driver steering input indicates that the driver is satisfied with the current offset (e.g., by straightening the steering wheel and/or selecting a direction of travel parallel to the lane). At this point, the current position of the vehicle is used as the new offset 114 and the system enters state 106. State 106 is essentially the same as state 102, although a new offset 114 replaces the initial offset 116 as shown by vehicle position 112.

Throughout the various states (102-106 and also 202-206 in FIGS. 2 and 3) the system can continue to monitor the current position (localization) of the vehicle within the lane. For example, to generate the AAS signal in state 102, the current position of the vehicle is compared to the current offset. In state 104, the driver is modifying the offset. Accordingly, continuous monitoring of the current position is not a necessary component in all embodiments. In practice, however, the current position can still be monitored as it can be used to determine the new offset used in state 106.

In certain instances determinations of the lane and/or the vehicle position with the lane may be relatively coarse and/or inaccurate. This can be due to a variety of factors, such as lack of proper input from position sensing/determining equipment, speed of the vehicle, lack of sufficient landmarks and the like. This coarse positional information can still be used to provide the AAS signal to the extent possible. As the positional information becomes less accurate, the driver may be required to provide more frequent corrections/adjustments to the vehicle direction. For example, certain sensing inaccuracies can lead to error accumulation relative to the positional determinations. The merging of driver input with the automated functions of the system can be particularly useful for compensating for such errors.

In one embodiment of the present invention, a different mechanism is used to provide the steering input for modifying the lateral offset. For instance, an input device such as, button(s), sliding bar(s), joystick(s) or voice commands, allow the driver to indicate a left or right change of the offset. For example, the driver can press a left-shift button to indicate a desired left shift in the lateral offset. The system responds by shifting the lateral offset by a predetermined amount or shifting the lateral offset and the vehicle position until the driver releases the button. In a specific embodiment, the input device is implemented in addition to the standard steering mechanism, such as by placing buttons on the steering wheel. The driver would then be free to use either of the standard steering mechanism (steering wheel) or the additional input device (e.g., button(s), sliding bar, joystick, or voice commands).

Figure 2:
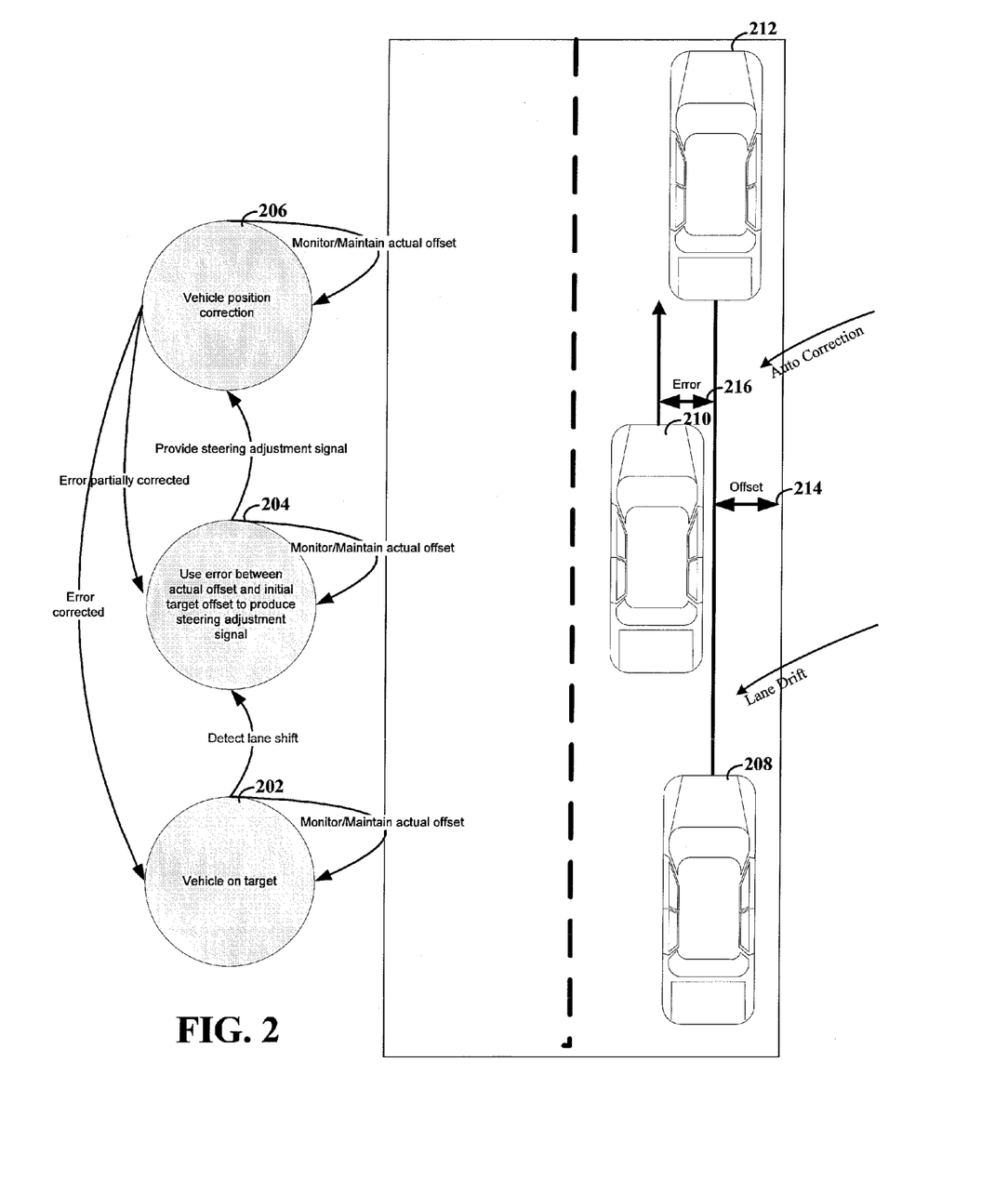
FIG. 2 shows a state diagram for an automated driving assistance system and corresponding vehicle placement, according to an example embodiment of the present invention.

FIG. 2 shows a state diagram for an automated driving assistance system and corresponding vehicle placement, according to an example embodiment of the present invention. In particular, FIG. 2 shows various functions of the system that could be implemented within state 102 or 106 of FIG. 1. At state 202 the vehicle is shown in a position 208 where the vehicle is traveling parallel to the lane at an offset of 214. The vehicle position is monitored and compared against the offset 214. If a difference/error is detected between the monitored vehicle position and the offset 214, the system enters state 204. Such an error represents the vehicle exhibiting a lateral shift of position within the lane as shown by position 210 and error 216. The lateral shift can be caused by any number of factors including, but not limited to, lane curvature, crowning of or irregularities in the road surface, tire misalignment, vehicle slippage or wind.

In state 204, the system determines how to correct for the detected lane shift. A steering adjustment signal is generated accordingly. This signal can be used to move the car back to the offset 214 by, for example, trimming the tires.

In state 206, the system provides a steering adjustment signal that can be used to trim the tires and correct the determined vehicle position error. The vehicle position error determined in step 204 can be continually updated until it is determined that the vehicle positional error has been corrected, as shown by vehicle position 212, at which time the system enters state 202.

Although not explicitly shown in the figure, it is possible that the steps show herein occur with high frequency, such that the steps essentially occur at the same time. Moreover, some of the steps can be implemented substantially in parallel. For example, the determination of the error can occur in parallel with the trim of the wheels, thereby providing a continuously updated steering assist signal.

Thus, the general components discussed in connection with FIG. 2 (and FIG. 3 below) can be implemented using a variety of algorithms and methods. In a specific embodiment, the following steps are repeatedly performed at a relatively high frequency. A lateral offset error is computed as a function of the current position of the vehicle and a target position of the vehicle. The target position is relative to the current lateral offset and the current position is a function of a localization input/determination. An AAS signal is generated from the offset error. Ultimately, the vehicle direction is modified as a function of the AAS signal. The vehicle direction can be changed be computing a steering torque to be applied to the steerable tires (e.g., using a proportional-integral-derivative (PID) controller) or as a direct angle for the steerable tires. The steps can be repeated to maintain the current lateral offset.

The trim (e.g., amount and/or direction) of the vehicle tires can be entirely characterized within the AAS signal or derived from the AAS signal and additional information. For instance, the AAS signal could simply indicate the amount of error. A secondary processing step could factor in other aspects such as vehicle speed, vehicle heading, road curvature, vehicle types and calibration parameters. The secondary processing could be implemented using additional module(s)/processor(s). This could be useful in producing modular components that can be used with various vehicles and types of vehicles.

For example, it would be expected that a compact car may respond to steering input differently than a large truck would respond to the same steering input. Such differences could be incorporated into the production of the AAS signal by, for example, setting appropriate parameters for different vehicles. Alternatively, the AAS signal could be implemented as a relatively generic signal and a secondary processor arrangement could be provided for each vehicle type. This secondary processor arrangement could be individually tailored to the specific vehicle.

Varying degrees of processing between the two alternatives could also be implemented. For instance, the AAS signal could be derived as a function of vehicle speed, vehicle heading and road curvature, at the same time additional details about the specific vehicle are used as a secondary processing step. The various embodiments herein, unless otherwise stated, discuss the AAS signal in a relatively generic sense. Notwithstanding, various levels of processing could be implemented as part of generating the AAS signal. The processing could also be performed at different locations and to different levels of specificity.

In a specific embodiment of the present invention, the automated vehicle controls allows the vehicle to operate without, necessarily, receiving driver-initiated steering input during the stages depicted in FIG. 2. This can be useful for reducing the burden on the driver and for avoiding potentially dangerous lane-shifts due to inattentive or distracted drivers. Moreover, in various embodiments and as discussed in connection with FIG. 1, the driver can be allowed to make adjustments or override the automated steering at any point. This can be particularly useful for allowing the driver to assert control of the vehicle, especially in emergency situations.

Figure 3:
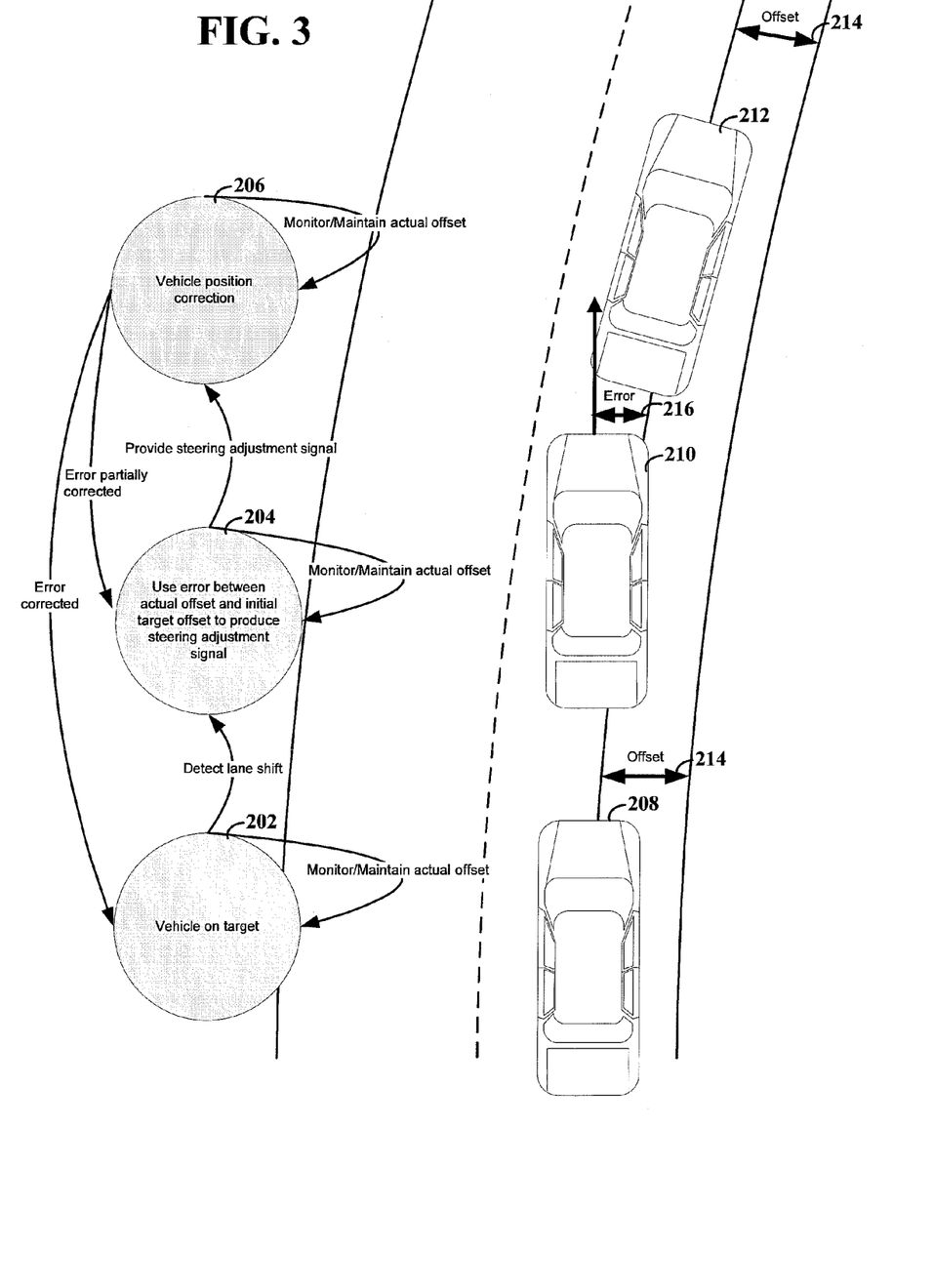
FIG. 3 shows a state diagram for an automated driving assistance system and corresponding vehicle placement, according to an example embodiment of the present invention.

FIG. 3 shows a state diagram for an automated driving assistance system and corresponding vehicle placement, according to an example embodiment of the present invention. Using an application of the same general concept discussed in connection with FIG. 2 the system can be used for more complex implementations. In particular, FIG. 3 shows that the state diagram of FIG. 2 can be applied to curved roads.

In specific embodiments, the lane drift discussed in connection with FIG. 2 is, at least partially, due to the curvature of the road. In this instance the error 216 is a result of the curvature of the road. In one such embodiment, the system provides a signal to trim the tires in response to the vehicle departing from the offset 214. Where the response of the system is sufficiently fast and spatially precise, the actual departure can be minimal even to the point of being imperceptible to a passenger or driver of the vehicle. According to another such embodiment, the system predicts road curvature and trims the tires prior to an error occurring. Thus, the system can preempt errors from occurring. In some cases, the prediction can be modified according to a detected offset error that, nevertheless, occurs. The detected error could be due to an improper prediction or other causes of lane drift.

In one embodiment of the invention, an automated steering assistance system can respond to a secondary (alert) signal by safely steering the vehicle out of the lane. This secondary signal can be triggered by any number of different events. A few non-limiting examples include a signal from an emergency vehicle, detection of adverse driver conditions (e.g., asleep, unconscious or injured) and vehicle problems (e.g., engine failure or flat tire). This lane departure can be implemented with additional safety features, such as vehicle avoidance systems, speed reduction and/or automatic enabling of vehicle hazard lights. In certain instances, the driver can still be allowed to steer the vehicle, if desired, by activating the steering wheel. This allows the driver to override the safety procedure in an emergency situation, or upon the driver leaving in an incapacitated state.

According to another embodiment of the invention, the processing necessary to generate the AAS signal can be used to provide additional functions. For example, the lane prediction and the offset thereof can be displayed to the driver. In one instance a separate display screen can show the predicted path for the vehicle as a function of the offset. This can facilitate the driver in monitoring the accuracy of the prediction and, if necessary, overriding the automated control. In another instance, the predicted path can be projected over the driver's view of the actual road. For example, a transparent display screen can highlight the predicted path as a function of the driver's position within the car and the distance to the road. Other possibilities include, but are not limited to, a headset or glasses with a display.

Another example use for data from such processing is to establish a database of previous driving habits. For example, the system could detect when a driver chooses to override the automated functions and use the detection information to establish driving habits. This can include different offsets for particular types of road conditions (e.g., curves, multi-lane, single-lane, speeds or amount of traffic) or for specific locations. In certain embodiments different settings can be saved in the database for respective drivers or even different profiles for the same driver (e.g., a first profile for rainy conditions and a second profile for sunny conditions). The driver can select the appropriate profile, or the system can automatically choose a profile.

Figure 4:
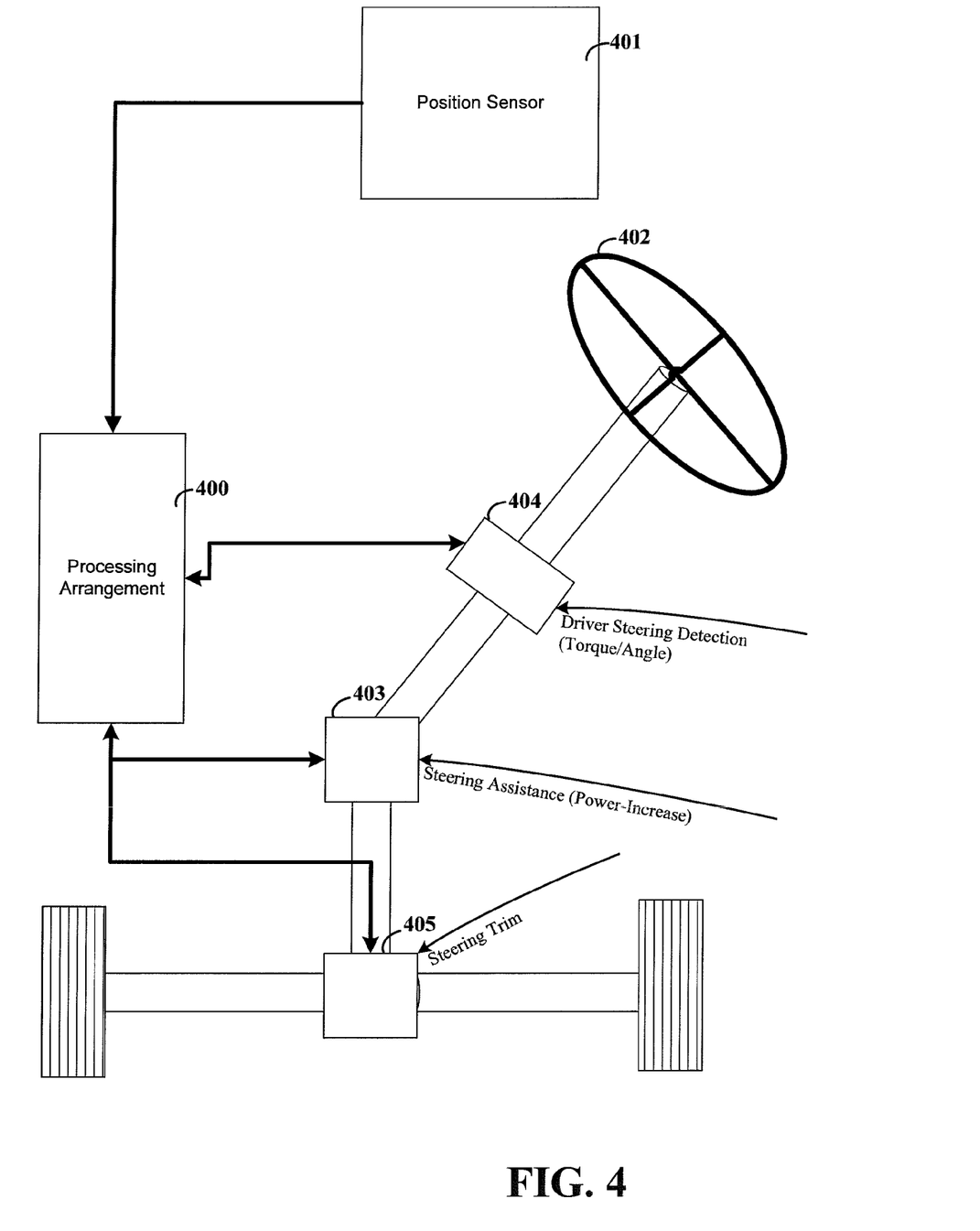
FIG. 4 shows a driving-assistance system with a processing arrangement and a sensor, according to an example embodiment of the present invention.

In one embodiment of this invention shown in FIG. 4, a processing arrangement 400 (e.g., a computer or specialized hardware), equipped with a sensor 401 (e.g., optical camera, GPS and/or laser), assesses the position of the vehicle by, for example, identifying and localizing lane markings on the road. Techniques for finding and localizing lane markers vary widely and aspects of the present invention are directed toward a flexible and modular approach that allow for the use of many different techniques. Processing arrangement 400 calculates the relative offset of the vehicle center to the lane markings. The difference between the desired and the actual lateral offset result in an AAS signal that controls an electronic steering controller 403 and/or 405, connected to the steering wheel 402. The system detects steering input from the human driver via a sensor 404, such as a torque or positional sensor. This steering input is also processed by processing arrangement 400, where it is added to the output of the steering controllers 403/405, to provide the driver with full steering control at all times. When a steering torque or positional deviation is detected, the computer also changes the value of the desired lateral offset in accordance to the human steering input, so that once the person suspends active steering, the chosen lateral offset is being maintained. For example, the driver of the vehicle can indicate a desired change in lateral offset by turning a steering wheel in one direction. This results in the vehicle direction changing accordingly. Once the driver is comfortable with the offset of the vehicle, the driver can straighten the steering wheel, thereby indicating that the current offset is acceptable. This example is merely exemplary and a number of different embodiments are possible, some of which are discussed in more detail herein. A few examples include, but are not limited to, non-wheel-based steering systems, drive-by-wire and/or accepting less than straightened wheel position as centered when navigating a curved road.

According to another embodiment of the present invention a system includes an optical camera that identifies lane markings on the road. A human driver uses the steering wheel to control the vehicle direction. Steering torque from the human driver can be amplified by a steering booster (e.g., power steering). The booster includes a torque sensor, whose signal is fed back to the system. When active, a steering control (e.g., an electric motor) trims the actual direction of the steerable tires of the vehicle, by adding a rotational offset (trim) to the steering assembly thereby modifying the pointing direction of the steerable tires without affecting the orientation of the steering wheel. The system memorizes the desired lateral offset, and trims the steering via the steering control so as to maintain a desired lateral offset from the road or lane boundary.

In another embodiment, a processing arrangement is connected to a database and an inertial navigation sensor. The database contains a geometric description of roads, and the inertial navigation system may use the satellite-based Global Positioning System (GPS) to determine the location of the vehicle relative to this road database. Optionally, a an optical camera, laser, or other device is used to determine the coordinates of the vehicle with even higher precision than presently possible with GPS. Such an embodiment may use any suitable methods to trim the direction of the steerable tires. This trimming is in addition to any steering direction provided by a steering booster, which detects and amplifies steering torque provided by the driver via the steering wheel. The processing arrangement provides a signal to the steering controller (e.g., trimming motor) to modify the steering direction of the steerable tires so as to maintain a constant lateral offset to the boundaries of the lane, provided that no torque is asserted on the steering wheel.

According to another embodiment, an optical camera is used to detect and localize lane markings on the road. The computer is also connected to a steering booster equipped with a torque sensor for measuring human driving torque, as asserted through the steering wheel. In this embodiment, the trimming of the steerable tires can be achieved through a modification of the steering wheel angle supplied by the steering booster. Therefore the steering booster 402 serves a dual purpose, namely the amplification of human steering torque and the trimming of to follow the road curvature. In one instance, the trimming is not physically decoupled from the steering wheel and an automatic trimming will result in a rotation of the steering wheel. Thus, the steering tire will move when driving a curved road even without human steering input.

Aspects of the present invention involve comparing the actual lateral offset of the vehicle with a desired lateral offset. An AAS signal is provided to facilitate trimming of the steering direction so as to reduce the divergence between these actual and desired lateral offsets. The steerable tires are trimmed so as to maintain a desired lateral offset as can be implemented using proportional-integral-derivative (PID) controllers. Such controllers steer in proportion to the error between the desired and the observed lateral offsets; they dampen the trimming by considering differential changes over time; and they adjust to systematic disturbances by reacting to integral errors over time. Aspects of the invention do not depend on one specific realization of the controller for maintaining a desired lateral offset. Instead, the invention includes implementations that include any number of different control methods.

Aspects of the present invention involve the use of a processing arrangement, such as a computer, to maintain a desired lateral offset. This desired lateral offset might be in reference to a variety of reference points related to the lane, such as a lane boundary, a road boundary, or a road centerline. Boundary or centerline data may be taken from a number of different sources including, but not limited to, a road database, and/or acquired by a sensor (optical or otherwise). In case of multiple lane markings, the processing arrangement may maintain multiple such desired offsets for each lane marking. The desired lateral offset may then be computed by combining these multiple values, e.g., via averaging, or by using an offset relative to the current lane. Offsets may be represented in any number of ways, such as by storing a lateral offset value relative to a base trajectory defined explicitly, or derived implicitly, from a digital road database, or relative to environmental features such as lane markings or curbs detected by sensors on the vehicle.

According to one embodiment, the processing arrangement monitors the actual lateral offset at high frequencies of 20 Hertz or more. This may be achieved by referencing lane markings detected by the optical sensors, or by referencing a road database in conjunction with the location information provided by the inertial navigation system. The difference between the actual and the desired lateral offset is the lateral offset error. A proportional-integral-derivative (PID) controller can then be used to zero the lateral offset error by trimming the steerable tires accordingly.

In situations where no lane markers can be identified, and/or on roads not contained in the road database, the system may effectively disable automated steering (e.g., by simply assuming that the lateral offset error is zero or disabling the AAS/trim signal(s)). As a result, the vehicle direction is not affected by any automated trimming of the steerable tires, and hence relinquishes any effect on the steering of the vehicle to the driver.

In one embodiment, when the processor arrangement detects a torque on the steering wheel, the system can reset the desired lateral offset to match the current/actual lateral offset. As a result, the lateral offset error will be zero. In some embodiments, the processor arrangement will not modify the present steering trim value. In other embodiments, the trim will slowly be moved to zero, such that while the vehicle is being steered by the person, the vehicle behaves as if equipped with conventional steering.

On a multi-lane highway, the driver may use the steering wheel to change lanes. In such a situation, the reference lane markers for the desired lateral offset will change, as the vehicle veers from one lane into another lane. In one embodiment, where lane changes will require the driver to apply torque to the steering wheel, the system automatically adjusts to the new reference lane markers when such a lane change occurs, without disruption of the driving experience.

In one embodiment, the automated assistance is active whenever the vehicle is being used. The system can be configured to limit the amount by which the steering can be trimmed in either direction. This can ensure that a driver is able to overcome the effect of such steering trim, and to steer the vehicle in the desired direction, even where, for example, the direction that is orthogonal to the lane direction. In some embodiments, the steering trim is smoothly reset to zero when the driver's orientation is orthogonal to the lane direction. In other embodiments, the trim applied by the PID controller is a function of the actual divergence in vehicle and lane direction, so that no steering trim is applied if both point into significantly different directions.

In various embodiments, the driver can invoke the present invention at will using, for example, an on/off switch.

In various embodiments, the vehicle constantly monitors the vehicle direction and compares it to the curvature of the road. If this difference exceeds a predefined threshold, the steering trimming is disengaged.

In various embodiments, the vehicle uses an encoder to measure steering wheel angle rather than torque applied by a human driver, and uses this measured angle to determine steering input from the human driver. In such embodiments, the steering wheel may assume a canonical position (zero degrees) when no human input is provided. As the encoder detects a difference between the canonical position and the actual position, this difference is amplified into steerable wheel orientation, and the desired lateral offset is adjusted accordingly. In one instance, the canonical position can be modified to compensate for road curvature. For instance, a driver maintaining a substantially parallel trajectory through a curved portion of a road would turn the wheel in the direction of the curvature. The canonical position can be temporarily adjusted accordingly. In some instances, the system can return the wheel to the true zero position once the road straightens. This can help keep the wheel orientation consistent for the driver.

In certain embodiments, the vehicle includes a drive-by-wire system. For example, some systems allow a driver to control the steering of the vehicle by converting a steering input into an electrical signal. This electrical signal is then used to steer the vehicle by modifying the direction of the tires. This effectively decouples the mechanical motion of the driver in steering from the transfer of steering direction to the tires. For such an implementation, the steering trim can be accomplished as a modification of the electronic signal used to steer the vehicle.

According to one embodiment of the present invention, a vehicle is equipped with a GPS antenna and steering and tire odometer and/or inertial measurements. The various inputs are used to determine the present position of the vehicle and thereby provide a meaningful assistive benefit to the driver even in the absence of global or local position precision sufficient to determine a precise location of the vehicle within a lane. This particular embodiment of the invention can thus be readily implemented without requiring an optical device or other sensor system to provide accurate localization, which can add considerable cost and may not be effective in all circumstances.

Aspects of the present invention are particularly useful when used in commercial vehicles with navigation systems that are insensitive to localization error on the order of meters (e.g., GPS) as they can still be used to facilitate a human driver in steering. Because imprecise localization (e.g., an error of several meters on a highway) can still allow a relatively accurate estimate of road curvature when used with commercially available road databases, the road's curvature can still be trimmed from the vehicle's steering, thereby necessitating that the driver make only those minor corrections to the vehicle's path that accrue slowly due to localization error. This residual error is then only a very small fraction of the lateral offset that necessarily accrues when steering straight on a curved road in a traditional vehicle.

A possible benefit to the driver is a greatly reduced need for interaction with the vehicle; while not completely eliminated, the steering input required from the driver can be lessened dramatically. Consequently, even in the absence of precise location and/or complete lane information, aspects of the invention can be particularly useful for substantially decreasing the risk that a tired, intoxicated, or distracted driver might stray from their lane.

In another embodiment of the invention, a processor (e.g., computer) is able to estimate the accuracy of its curvature calculation and to exhibit different behavior modes depending on the estimate. Specifically, if the processor determines that a level of uncertainty about the present curvature of the road is too great for safe road/lane-following, the vehicle may disengage the trimming feature and alert its driver in one of many possible ways (e.g. an audible beep or vibrating steering wheel). This aspect of the present embodiment may be implemented in software as follows:

The localization uncertainty of the positioning estimate is computed, which may be determined based on a number of factors, such as the quality of lane marker detection and/or the number of GPS satellites visible. For example, a standard deviation representing position uncertainty in meters can be computed using quantitative metrics associated with the variables in question. In the event that global positioning is used, a value can be readily computed from the number of satellites visible, their signal quality, and the precision of odometer and/or inertial measurements available. Alternatively, if feature detectors are used to detect lane markings or other environmental features, the feature detector(s) can report confidence metrics, which can directly be used in the uncertainty calculation; this estimate can be calculated with or without global information.

Next, the variance of the expected curvature of the road is determined. When using global positioning and a digital road map database, the curvature of the road can be sampled from the digital map at various points in the distribution computed from the previous step. Depending on the resolution and accuracy of the road map, interpolation may be used to estimate the curvature at a specific point. By way of example, if the global location uncertainty is approximated using a Gaussian distribution with a standard deviation of 3 meters, the curvature of the road may be sampled from that distribution using a Monte Carlo approach, yielding a distribution of curvatures. At this point, the variance of the curvature distribution can be readily calculated.

The variance of expected road curvature may be similarly estimated from incoming sensor data, such as from an optical camera or laser detecting lane markings on the ground. In this case, lower confidence in sensor readings from the upcoming road ahead will result in a wider variance of curvature possibilities. If a digital road database is unavailable, this method may be used on its own to estimate curvature uncertainty.

Alternatively, if a digital road database is available, the calculations in this step may be combined with those in the previous step. In some instances, this combination can be useful in producing a more accurate result.

Optionally, when the computed variance from the previous steps exceeds a threshold, the assistance system can be disengaged and the driver can be warned using, for example, visual warnings, audible warnings or physical warnings (e.g., vibration of the wheel). Alternatively, the system may continue to actively steer the vehicle, but warn the driver so that she understands that extra attention may be required.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A method for providing automated assistive steering of an automotive vehicle to maintain the vehicle along a travel direction within a vehicle lane by providing automated assistive steering relative to a target current vehicle offset for a lateral position relative to the travel direction, the method comprising:
   detecting steering input from a driver that results in a change in the lateral position of the vehicle in the lane relative to the target current vehicle offset;
   modifying, in response to steering input from a driver, the target vehicle offset within the vehicle lane according to the change in the lateral position of the vehicle and thereby maintaining the vehicle along a new path in the vehicle lane.

2. The method of claim 1, further including the step of trimming vehicle tires as a function of the modified target vehicle offset and without modifying a position of a steering device, that allows a driver to provide the steering input.

3. The method of claim 1, wherein the steering input from the driver includes the driver turning a steering wheel and subsequently straightening the steering wheel, thereby steering the vehicle along the new path.

4. The method of claim 1, further including the step of trimming tires of the vehicle to maintain the modified target vehicle offset.

5. The method of claim 1, further including the step of trimming tires of the vehicle to maintain the modified target vehicle offset while the vehicle lane exhibits a curve that is a sufficiently sharp angle that the vehicle would leave the lane without trimming tires of the vehicle.

6. The method of claim 1, further including the step of providing an indication to a driver of the vehicle of what the target vehicle offset is relative to the lane.

7. The method of claim 1, further including the step of detecting the vehicle lane using one or more of an optical camera, a laser, an inertial measurement unit, a tire odometer and a global positioning system (GPS) receiver.

8. The method of claim 1, wherein the steering input from a driver is provided using a drive-by-wire steering system.

9. The method of claim 1, further including the step of trimming tires of the vehicle to maintain the modified target vehicle offset as a function of one or more of vehicle speed, vehicle heading, road curvature, vehicle types and calibration parameters.

10. A method for providing automated assistive steering of an automotive vehicle along a travel direction to maintain the vehicle at a target vehicle offset for a lateral position relative to the travel direction within a vehicle lane and for allowing a driver to control where the target offset places the vehicle within the vehicle lane, the method comprising:

determining a current vehicle location within the vehicle lane as a function of a current vehicle-position signal;

setting, in response to a driver steering input, the target vehicle offset within the vehicle lane relative to the current vehicle location; and generating, in response to an error between a current vehicle-position and the target vehicle offset, a steering trim-adjust signal to facilitate automatic assistive steering for the automotive vehicle.

11. The method of claim 10, wherein the step of generating a steering trim-adjust signal is a function of one or more of vehicle speed, vehicle heading, road curvature, vehicle types and calibration parameters.

12. The method of claim 11, further including the step of disabling the steering trim-adjust signal in response to determining that the steering trim-adjust signal has insufficient accuracy.

13. The method of claim 10, further including the steps of: sensing the actual position of the vehicle to provide the current vehicle-position; determining the error between the current vehicle-position and the target vehicle offset; and using the steering trim-adjust signal to direct the steering controller and thereby maintain the vehicle within a vehicle lane as a function of the target vehicle offset.

14. The method of claim 10, wherein the current vehicle-position is used to maintain the vehicle in a forward-moving lateral position in the vehicle lane; and redirecting the steering controller, in response to a subsequent driver steering input, to facilitate an effort to maintain the vehicle in a different forward-moving lateral position in the vehicle lane.

15. The method of claim 10, wherein the modified target vehicle trajectory corresponds to a non-zero offset from a center of the vehicle lane, whereby the non-zero offset is used to maintain the vehicle in a vehicle path that is substantially parallel to the center of the vehicle lane.

16. The method of claim 10, further including the step of detecting a driver steering input that indicates an override operation for the steering trim-adjust signal.

17. The method of claim 10, further including the step of determining the vehicle lane from a plurality of input sources.

18. The method of claim 10, further including the step of determining the vehicle lane based on: a plurality of input sources; and an average of outcomes generated by a plurality of vehicle lane prediction algorithms, each vehicle lane prediction algorithm using data from at least one of the plurality of input sources.

19. The method of claim 10, wherein the driver steering input is derived from a torque sensor that detects force exerted by the driver on a steering element.

20. The method of claim 10, further including the step of receiving an alert signal and, in response thereto, automatically generating a new steering trim-adjust signal to redirect the automotive vehicle out of the vehicle lane for safety.

21. The method of claim 10, wherein the steps of determining and setting facilitate a driver to modify the target vehicle offset within the same vehicle lane by, detecting that a steering wheel is not in a centered position;

deactivating, in response to detecting that the steering wheel is no longer in the centered position, the automatic assistive steering for the automotive vehicle;

detecting that the steering wheel has returned to the centered position;

determining the current vehicle location at the time that the steering wheel has returned to the centered position;

storing the current vehicle location at the time that the steering wheel has returned to the centered position; and activating, in response to detecting that the steering wheel has returned to the centered position, the automatic assistive steering for the automotive vehicle while changing the target vehicle location to be set according to the current vehicle location at the time that the steering wheel has returned to the centered position.

22. The method of claim 10, wherein the steps of determining and setting facilitate a driver to modify the target vehicle offset within the same vehicle lane by detecting that a turning force has been applied to a steering wheel to modify the current vehicle location within the vehicle lane;

deactivating, in response to detecting that the force, the automatic assistive steering for the automotive vehicle;

detecting that the force is no longer applied to modify the current vehicle location within the vehicle lane;

determining the current vehicle location at the time that the force was detected as no longer applied;

storing the current vehicle location at the time that the force was detected as no longer applied; and activating, in response to detecting that the force was detected as no longer applied, the automatic assistive steering for the automotive vehicle while changing the target vehicle location to be set according to the current vehicle location at the time that the force was detected as no longer applied.

23. The method of claim 10, wherein the steps of determining and setting facilitate a driver to modify the target vehicle offset within the same vehicle lane by pressing a button to indicate a desired shift in the lateral offset.

24. For automatic assistive steering of an automotive vehicle operating in a vehicle lane with the vehicle operating responsive to manually-controlled driver steering forces, a computer readable medium containing a set of computer-executable instructions that, when executed, causes a computer in the automotive vehicle to:

set, in response to a driver steering input, a target vehicle offset that indicates a lateral position, relative to a direction of travel, within the vehicle lane, wherein the target vehicle offset is relative to the current vehicle location; and generate, in response to an error between a current vehicle-position and the target vehicle offset, a steering trim-adjust signal to facilitate automatic assistive steering for the automotive vehicle.

25. The computer readable medium of claim 24, wherein the driver steering input is responsive to the driver turning a steering wheel and subsequently straightening the steering wheel, thereby placing the vehicle at the lateral position within the vehicle lane.

* * * * *